US009263207B2

(12) United States Patent
Iwata

(10) Patent No.: US 9,263,207 B2
(45) Date of Patent: Feb. 16, 2016

(54) SWITCH DEVICE

(75) Inventor: Atsuki Iwata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 830 days.

(21) Appl. No.: 13/422,069

(22) Filed: Mar. 16, 2012

(65) Prior Publication Data

US 2012/0235475 A1 Sep. 20, 2012

(30) Foreign Application Priority Data

Mar. 18, 2011 (JP) ................................ 2011-061649

(51) Int. Cl.
*H01H 47/00* (2006.01)
*B60L 1/00* (2006.01)
*H01H 9/54* (2006.01)

(52) U.S. Cl.
CPC ............ *H01H 9/547* (2013.01); *Y10T 307/826* (2015.04)

(58) Field of Classification Search
CPC H01H 9/547; Y10T 307/826; Y10T 307/615; Y10T 307/625; Y10T 307/878; Y10T 307/891; G05B 19/4063; G05B 2219/41309; G05B 2219/50082; G05B 2219/50083
USPC ........... 335/2, 59–65, 68, 71, 72; 307/132 E, 307/132 T, 64, 66; 700/79; 318/563, 671
See application file for complete search history.

(56) References Cited

U.S. PATENT DOCUMENTS

| | | | | |
|---|---|---|---|---|
| 3,723,923 | A * | 3/1973 | Suzuki | 335/81 |
| 4,005,349 | A * | 1/1977 | Brian | 318/569 |
| 4,378,541 | A * | 3/1983 | Kanada et al. | 335/61 |
| 4,625,205 | A * | 11/1986 | Relis | 340/4.35 |
| 5,422,808 | A * | 6/1995 | Catanese et al. | 700/79 |
| 5,710,959 | A * | 1/1998 | Hirooka et al. | 399/88 |
| 5,963,224 | A * | 10/1999 | Shimoda | 347/5 |
| 6,295,192 | B1 * | 9/2001 | Kishida et al. | 361/160 |
| 2011/0072281 | A1 * | 3/2011 | Song et al. | 713/300 |
| 2011/0134707 | A1 * | 6/2011 | Kim | 365/189.05 |
| 2011/0181380 | A1 | 7/2011 | Iwata | |
| 2011/0216612 | A1 * | 9/2011 | Ishikawa | 365/194 |

FOREIGN PATENT DOCUMENTS

| | | | |
|---|---|---|---|
| JP | 2002-159143 | A | 1/2002 |
| JP | 2002-008490 | A | 5/2002 |
| JP | 2011-171284 | A | 9/2011 |

* cited by examiner

*Primary Examiner* — Rexford Barnie
*Assistant Examiner* — Elim Ortiz
(74) *Attorney, Agent, or Firm* — Harness, Dickey & Pierce, P.L.C.

(57) ABSTRACT

A switch device includes a switch operation unit to be mechanically operated so as to be in on or off state; a detecting unit configured to detect whether the switch operation unit is in the on or off state; a first mechanism to be configured to close electrical contacts of at least one circuit when the switch operation unit is operated to be in the on state; and a second mechanism configured to maintain the electrical contacts in an closed state and switch the electrical contacts to an open state in response to electrical signals indicating off, on, and, off to be received sequentially while the switch operation unit is in the off state.

18 Claims, 9 Drawing Sheets

SWITCH DEVICE

CROSS-REFERENCE TO RELATED APPLICATIONS

The present application claims priority to and incorporates by reference the entire contents of Japanese Patent Application No. 2011-061649 filed in Japan on Mar. 18, 2011.

BACKGROUND OF THE INVENTION

1. Field of the Invention

The present invention is a technology related to a switch device system for passing/interrupting an electrical signal or turning power on/off.

2. Description of the Related Art

As conventional technologies for energization/shutdown of AC power, for example, there are the following technologies. In a first conventional technology, energization/shutdown of AC power is performed in such a manner that AC contacts are closed/opened by on/off operation of a power switch. A second conventional technology is related to, for example, a projector device without a main switch, and the device is started up and set up for off after use by means of a push-button switch; after the setup for off, an AC plug is pulled out of a socket.

In general, these first and second conventional technologies are mainstream; however, the first conventional technology has a problem, for example, that if AC power supply is interrupted by sudden on-to-off operation of the power switch at the timing at which device off setup is not ready, such as when an HDD is in operation or during cooling of a DC power source or a heating unit, the device may be broken.

Furthermore, the second conventional technology can certainly set up for off of a device just like the first conventional technology; however, there are problems that as long as the AC plug is being inserted into the socket, AC power for detection of the push-button switch and setup for on is consumed all the time, so it is not possible to meet energy saving, and the device is not user-friendly.

To solve these problems, in a third conventional technology, the operation of a toilet fan switch is employed in energization/shutdown of AC power, and an on/off state of switch operation is configured to be detected by a different switch or a detecting means; upon detection of off, a device off setup process is promptly performed to prepare for subsequent showdown of AC power triggered by a clockwork timer of the fan switch.

This third conventional technology is superior in terms of certain device off setup with respect to showdown of AC power and no wasted power consumption; however, there are problems that the mechanical structure is somewhat complex and there is an increase in production costs. Furthermore, even if the device off setup is completed in a short time, it takes a predetermined time to shut down the AC power, so it may cause some wasted power consumption.

To solve such a problem, in a fourth conventional technology, relay contacts are provided in parallel with AC contacts of a power switch, and a switch and a relay are combined as a switch unit, and an electronic timer means is provided. This fourth conventional technology can solve the problems of the third conventional technology, but has problems that the switch unit increases several times in size as compared with the existing power switch, and twice as many AC contact circuits are required, and there is always wasted power consumption for excitation current constantly passed through the relay while the power switch is on and for operating the timer.

Furthermore, even if the device off setup is completed in a short time, it takes a predetermined time to shut down the AC power, so the problem of some wasted power consumption still remains.

Therefore, in a fifth conventional technology, the switch and the relay in the fourth conventional technology are separated, and a different switch or detecting means capable of detecting an on/off state of switch operation is provided to the switch unit, and no timer is mounted. The fifth conventional technology employs a method to perform off control of excitation power of the relay upon completion of a device off setup process after detection of off.

This fifth conventional technology is superior in terms of the certainty of execution of the device off setup process upon detection of the off state of switch operation and execution of shutdown of AC power immediately after completion of the device off setup process. However, in this fifth conventional technology, the problems that twice as many AC contact circuits are required and there is wasted power consumption for excitation current constantly passed through the relay while the power switch is on still remain. Furthermore, there is a problem of an increase in space to provide the different switch or detecting means.

For example, Japanese Patent Application Laid-open No. 2002-008490 and Japanese Patent Application Laid-open No. 2002-159143 disclose the conventional technologies as described above.

Therefore, there is a need for a switch device capable of: (1) safety shutdown of the apparatus even in the event of sudden turn-off of a power switch; (2) shutdown of AC power by operation of the power switch when the apparatus is not in use; (3) less wasted power while the apparatus is in operation; (4) less wasted power while the apparatus is in off mode; (5) saving of the space required for the switch and necessary parts as much as possible; (6) production at lower cost; and (7) implementing turn-off of switch contacts with certainty even in the event of out of control due to CPU runaway or the like and enabling a user to recognize such an abnormal condition.

SUMMARY OF THE INVENTION

It is an object of the present invention to at least partially solve the problems in the conventional technology.

According to an embodiment, there is provided A switch device that includes a switch operation unit configured to be mechanically operated so as to be in on state or off state; a detecting unit configured to detect whether the switch operation unit is in the on state or the off state; a first mechanism to be configured to close electrical contacts of at least one circuit when the switch operation unit is operated to be in the on state from the off state; and a second mechanism configured to maintain the electrical contacts in a closed state and switch the electrical contacts from the closed state to an open state in response to electrical signals indicating off, on, and, off to be received sequentially while the switch operation unit is in the off state when the switch operation unit is operated to be in the off state from the on state. The second mechanism outputs a fifth signal that is a logical OR of a third signal and a fourth signal, the third signal being a logical AND of a first signal indicating whether control of the electrical signal is possible or not and a second signal indicating detection of the switch operation unit being in the off state, the fourth signal being the electrical signal. If the first signal indicates that control of the electrical signal is not possible, the second mechanism outputs the third signal as the fifth signal, thereby switching the electrical contacts from the closed state to the open state. If the first signal indicates that control of the electrical signal is possible, the second mechanism outputs the fourth signal as the fifth signal, thereby switching the electrical contacts from the closed state to the open state.

According to another embodiment, there is provided a switch device that includes a switch operation unit configured to be mechanically operated so as to be in on state or off state; a detecting unit configured to detect whether the switch operation unit is in the on state or the off state; a first mechanism to be configured to close electrical contacts of at least one circuit when the switch operation unit is operated to be in the on state from the off state; a second mechanism configured to maintain the electrical contacts in a closed state and switch the electrical contacts from the closed state to an open state in response to electrical signals indicating off, on, and, off to be received sequentially while the switch operation unit is in the off state when the switch operation unit is operated to be in the off state from the on state; and a third mechanism configured to switch the electrical contacts from the closed state to the open state in response to the electrical signals indicating off, on, and, off to be received sequentially and switch the switch operation unit from the on state to the off state when the switch operation unit is in the on state and the electrical contacts are in the closed state. The second mechanism outputs a fifth signal that is a logical OR of a third signal and a fourth signal, the third signal being a logical AND of a first signal indicating whether control of the electrical signal is possible or not and a second signal indicating detection of the switch operation unit being in the off state, the fourth signal being the electrical signal. If the first signal indicates that control of the electrical signal is not possible, the second mechanism outputs the third signal as the fifth signal, thereby switching the electrical contacts from the closed state to the open state. If the first signal indicates that control of the electrical signal is possible, the second mechanism outputs the fourth signal as the fifth signal, thereby switching the electrical contacts from the closed state to the open state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a switch device system and an apparatus including the switch device system according to the present invention are explained in detail below with reference to accompanying drawings. Needless to say, the embodiments below explain an example of the present invention, and various changes, modifications, and refinements can be made by those skilled in the art without departing from the scope of the present invention, and the present invention is not limited to the embodiments below.

First Embodiment

Figure 1:
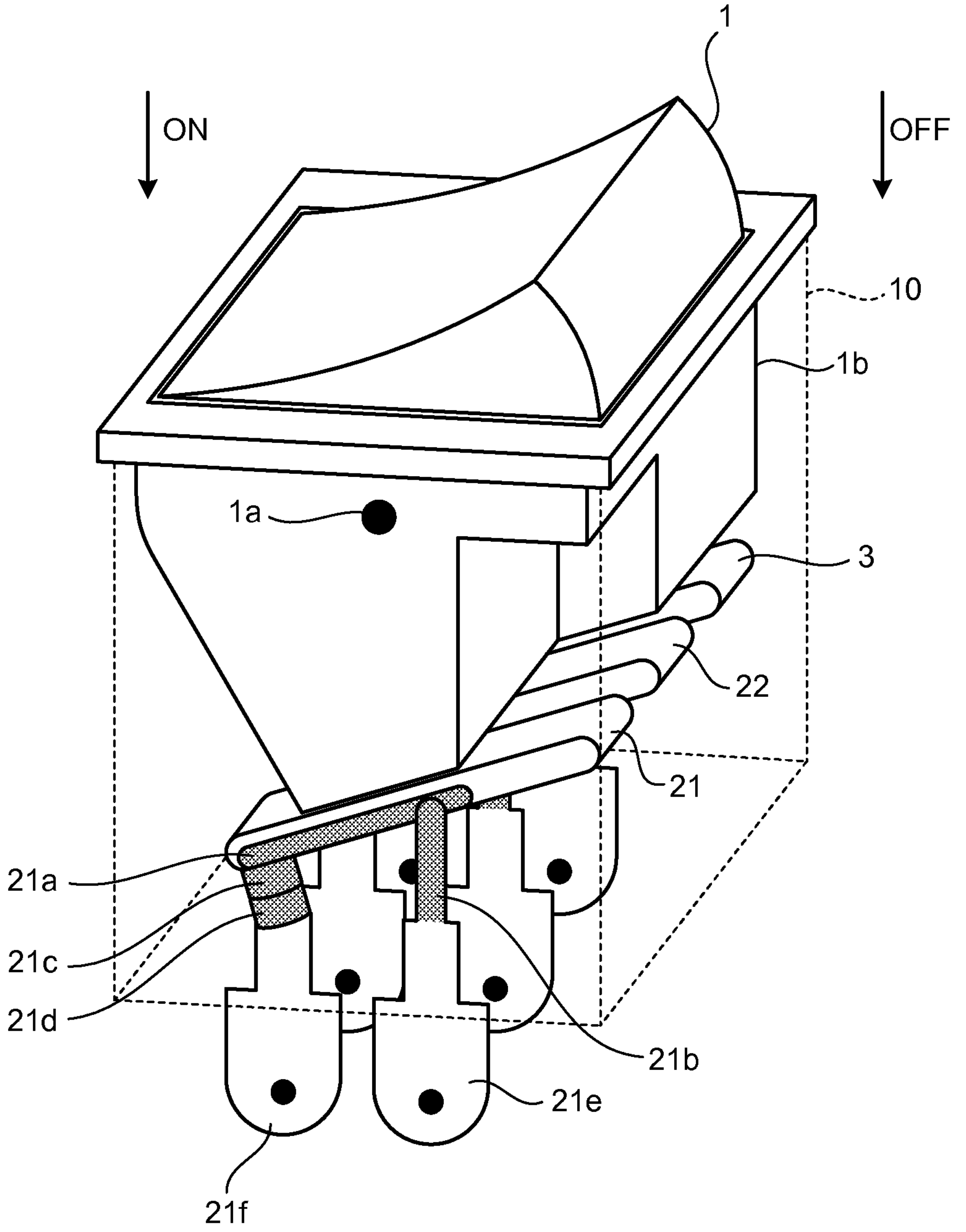
FIG. 1 is a schematic diagram showing the mechanical structure of a switch main body part of a switch device according to a first embodiment.

FIG. 1 is a schematic diagram showing the mechanical structure of a switch main body part 10 of a switch device according to a first embodiment. FIG. 1 illustrates a state where a switch operation unit 1 is in an on state.

As shown in FIG. 1, the switch main body part 10 according to the present embodiment mainly includes the switch operation unit 1, first switch contact levers 21 and 22, and a second switch contact lever 3. Furthermore, the switch main body part 10 according to the present embodiment includes, as first electrical contacts, a first switch contact lever-side contact 21*c* and a first switch terminal-side contact 21*d*, which correspond to the first switch contact lever 21, and a first switch contact lever-side contact (not shown) and a first switch terminal-side contact (not shown), which correspond to the first switch contact lever 22, below a lower part 1*b* of the switch operation unit 1.

Moreover, the switch main body part 10 according to the present embodiment includes, as second electrical contacts, a second switch contact lever-side contact (not shown) and a second switch terminal-side contact (not shown), which correspond to the second switch contact lever 3, below the lower part 1*b* of the switch operation unit 1.

In the switch device according to the first embodiment, the first electrical contacts are always in a closed state (contact on) when the switch operation unit 1 is mechanically in an on state, but even when on-to-off operation of the switch operation unit 1 is performed, the first electrical contacts are not switched from the closed state to an open state (contact off); on the other hand, the second electrical contacts are always in the closed state (contact on) when the switch operation unit 1 is in the on state, and are always in the open state (contact off) when the switch operation unit 1 is mechanically in an off state. Here, the second electrical contacts are the same as those is in a general switch device (a mechanism that switches electrical contacts to the closed state (contact on)/the open state (contact off) in synchronization with on/off operation of the switch operation unit).

The switch operation unit 1 is integrated with the lower part 1*b*, and can be rotated around a supporting point 1*a* as a central axis by being turned on/off by a user.

As shown in FIG. 1, out of an area of the lower part 1*b* of the switch operation unit 1 on the side opposite to the first switch contact lever-side contact 21*c*, a portion opposed to the first switch contact levers 21 and 22 is cut out. Therefore, the lower surface of the lower part 1*b* of the switch operation unit 1 never comes in contact with the upper surfaces of the first switch contact levers 21 and 22. On the other hand, out of an area of the lower part 1*b* of the switch operation unit 1 on the side opposite to the second switch contact lever-side contact, a portion opposed to the second switch contact lever 3 does not have such a cutout as shown in FIG. 1. Therefore, the lower surface of the lower part 1*b* of the switch operation unit 1 can come in contact with the upper surface of the second switch contact lever 3. Namely, as will be described later, when the switch operation unit 1 is turned off, the lower surface of the lower part 1*b* of the switch operation unit 1 presses only the second switch contact lever 3 and does not press the first switch contact levers 21 and 22.

When the switch operation unit 1 is turned on, the whole lower part 1*b* of the switch operation unit 1 is in contact with the first switch contact levers 21 and 22 and the second switch contact lever 3; in this on state, the first switch contact lever-side contact 21*c* and the first switch terminal-side contact 21*d* which correspond to the first switch contact lever 21, and the first switch contact lever-side contact (not shown) and the first switch terminal-side contact (not shown) which correspond to the first switch contact lever 22, and the second switch contact lever-side contact (not shown) and the second switch terminal-side contact (not shown) which correspond to the second switch contact lever 3 are maintained in the contact state. Therefore, the three pairs of the electrical contacts corresponding to the first switch contact levers 21 and 22 and the second switch contact lever 3, respectively, are in the closed state (contact on state), and a circuit current flows.

To explain the switch contact circuit corresponding to the first switch contact lever 21 more specifically, a terminal 21*e* on the side of a contacting conductor always in contact during operation of the first switch contact lever, a contacting conductor 21*b* always in contact during operation of the first switch contact lever, a first switch contact lever conductor 21*a*, the first switch contact lever-side contact 21*c*, the first switch terminal-side contact 21*d*, and a first switch on/off contact-side terminal 21*f* are electrically connected, thereby a circuit current flows. The same goes for two switch contact circuits (not partially shown) corresponding to the first switch contact lever 22 and the second switch contact lever 3, respectively.

On the other hand, when the switch operation unit 1 is turned off (on to off), since the lower part 1*b* of the switch operation unit 1 is in contact with the whole surface of the second switch contact lever 3 on the back side, the second switch contact lever 3 also rotates in accordance with the on-to-off operation of the switch operation unit 1, and the second switch contact lever-side contact (not shown) and the second switch terminal-side contact (not shown), which correspond to the second switch contact lever 3, are released from the contact state and put into the open state (contact off).

Furthermore, since a portion of the lower part 1*b* of the switch operation unit 1 on the side of the first switch contact levers 21 and 22 has the cutout, even when the switch operation unit 1 is turned off, the lower part 1*b* of the switch operation unit 1 does not come in contact with the first switch contact levers 21 and 22, so the first switch contact levers 21 and 22 are not pressed down. Therefore, in this state, the first switch contact lever-side contact 21*c* and the first switch terminal-side contact 21*d*, which correspond to the first switch contact lever 21, and the first switch contact lever-side contact (not shown) and the first switch terminal-side contact (not shown), which correspond to the first switch contact lever 22, are maintained in the contact state, i.e., the closed state (contact on).

By such a switch mechanism, whether the switch operation unit 1 is on or off can be detected by detecting the contact state of the second switch contact lever-side contact (not shown) and the second switch terminal-side contact (not shown), which correspond to the second switch contact lever 3, inside or outside the switch.

Furthermore, in the present embodiment, detection of the contact state of the second switch contact lever-side contact (not shown) and the second switch terminal-side contact (not shown) is used as a means of detecting whether the switch operation unit 1 is on or off; however, the means is not limited to this. For example, it can be configured to detect whether the switch operation unit 1 is on or off by use of a light-shielding plate for switching a light-receiving state of a photo interrupter which operates in conjunction with the switch operation unit 1.

Moreover, the second electrical contacts composed of the second switch contact lever-side contact and the second switch terminal-side contact can be configured to be opened (off)/closed (on) in synchronization with on/off operation of the switch operation unit 1, and the first electrical contacts composed of the first switch contact lever-side contact 21*c* and the first switch terminal-side contact 21*d* can be configured to be maintained in a closed state without synchronization with the on-to-off operation of the switch operation unit 1.

Subsequently, there is described a mechanism that switches the first electrical contacts from the closed state (contact on) to the open state (contact off) when the switch operation unit 1 is turned off (on to off).

Figure 2:
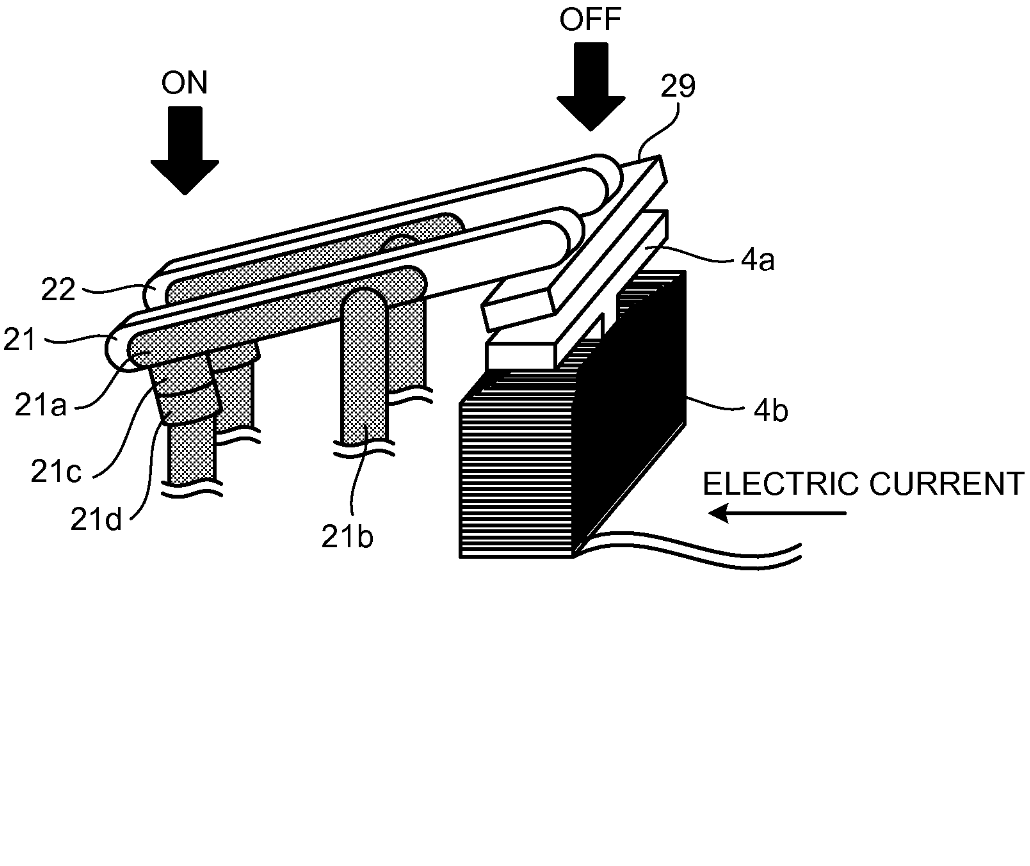
FIG. 2 is a schematic diagram showing the structure of a mechanism that switches first electrical contacts from a closed state (contact off) to an open state (contact off) in the switch device according to the first embodiment.

FIG. 2 is a schematic diagram showing the structure of the mechanism that switches the first electrical contacts from the closed state (contact on) to the open state (contact off) in the switch device according to the first embodiment. FIG. 2 illustrates only a lower part of the first switch contact levers 21 and 22. Furthermore, FIG. 2 shows a case where the switch operation unit 1 is turned off and no electric current flows through an electromagnet coil 4*b* for the on-to-off operation of switch contact lever.

When the switch operation unit 1 is turned off (on to off), as described above, the second electrical contacts (the second switch contact lever-side contact and the second switch terminal-side contact) go into the open state, but the first electrical contacts (the first switch contact lever-side contact 21*c* and the first switch terminal-side contact 21*d*, and the first switch contact lever-side contact (not shown) and the first switch terminal-side contact (not shown) which correspond to the first switch contact lever 22) are maintained in the contact state and are in the open state (contact on).

As shown in FIG. 2, in the switch main body part 10 shown in FIG. 1, an iron plate (a magnetic body) 29 for on-to-off operation of switch contact lever is bonded to the lower parts of the first switch contact levers 21 and 22. Consequently, the first switch contact levers 21 and 22 operate in conjunction with each other.

Furthermore, as shown in FIG. 2, in the switch main body part 10 shown in FIG. 1, an iron core 4*a* for the on-to-off operation of switch contact lever on which the electromagnet coil 4*b* is wound is placed to be opposed to the iron plate (magnetic body) 29. Here, the iron core 4*a* and the electromagnet coil 4*b* compose an electromagnet; when a circuit configuration to be described later passes electric current through the electromagnet coil 4*b*, the iron core 4*a* becomes magnetized. Therefore, by passing electric current through the electromagnet coil 4*b*, electromagnetic attractive force acts on between the iron core 4*a* and the iron plate (magnetic body) 29, thereby pulling down the right parts of the first switch contact levers 21 and 22 in FIG. 2. Consequently, the first electrical contacts, i.e., the first switch contact lever-side contact 21*c* and the first switch terminal-side contact 21*d* and the first switch contact lever-side contact (not shown) and the first switch terminal-side contact which correspond to the first switch contact lever 22 are released from the contact state and go into the open state (contact off). Here, the electric current passed through the electromagnet coil 4*b* can be either direct current or alternating current.

Incidentally, in the above, there is described the case where the switch operation unit 1 is turned off; in a case where the switch operation unit 1 is turned on, it can be configured that when electric current is passed through the electromagnet coil 4*b*, the first electrical contacts are released from the contact state, and the switch operation unit 1 is switched from on to off by force that pulls up the left parts of the first switch contact levers 21 and 22 in FIG. 2.

Furthermore, as the above-described switch structure, whether the first switch contact lever 21 is turned to the on side or the off side, the first switch contact lever conductor 21*a* and the contacting conductor 21*b* are always in contact. The same goes for the first switch contact lever 22 and the second switch contact lever 3.

By such a switch configuration, the first switch contacts inside the switch are kept on whenever the on-to-off operation of the switch operation unit 1 is performed, so the first electrical contacts are not suddenly disconnected. Therefore, after detection of the switch off state, a machine can be safely shut down or operation in progress can be completed. Furthermore, unlike the conventional technologies, there is no need to maintain relay contacts in on with excitation current, so there is no wasted power consumption. Consequently, even when a machine is working or is in off mode, energy for maintaining the first switch contact circuit is not required. This is because the contact on, i.e., the maintenance of contact of the first electrical contacts has been done by off-to-on operation of the switch operation unit 1.

When the on-to-off operation of the switch operation unit 1 is detected from the contact state of the second electrical contacts, the contact of the first electrical contacts can be turned off state by means of an electromagnet (bimetal or the like, in a second embodiment described later) after execution of pre-shutdown processing. The pre-shutdown processing is processing for safety shutdown of an apparatus before supply of AC input voltage to the apparatus is interrupted. Therefore, when the apparatus is not in use, the contact of the first electrical contacts can be turned off to reduce wasted power consumption and can interrupt the power supply.

Furthermore, unlike the conventional technologies, a relay circuit in parallel with the switch is not necessary. The first electrical contacts serve not only the switch function but also the relay function in the conventional technologies. Therefore, it is possible to achieve a compact, low-cost switch device and apparatus including the switch device.

Figure 3:
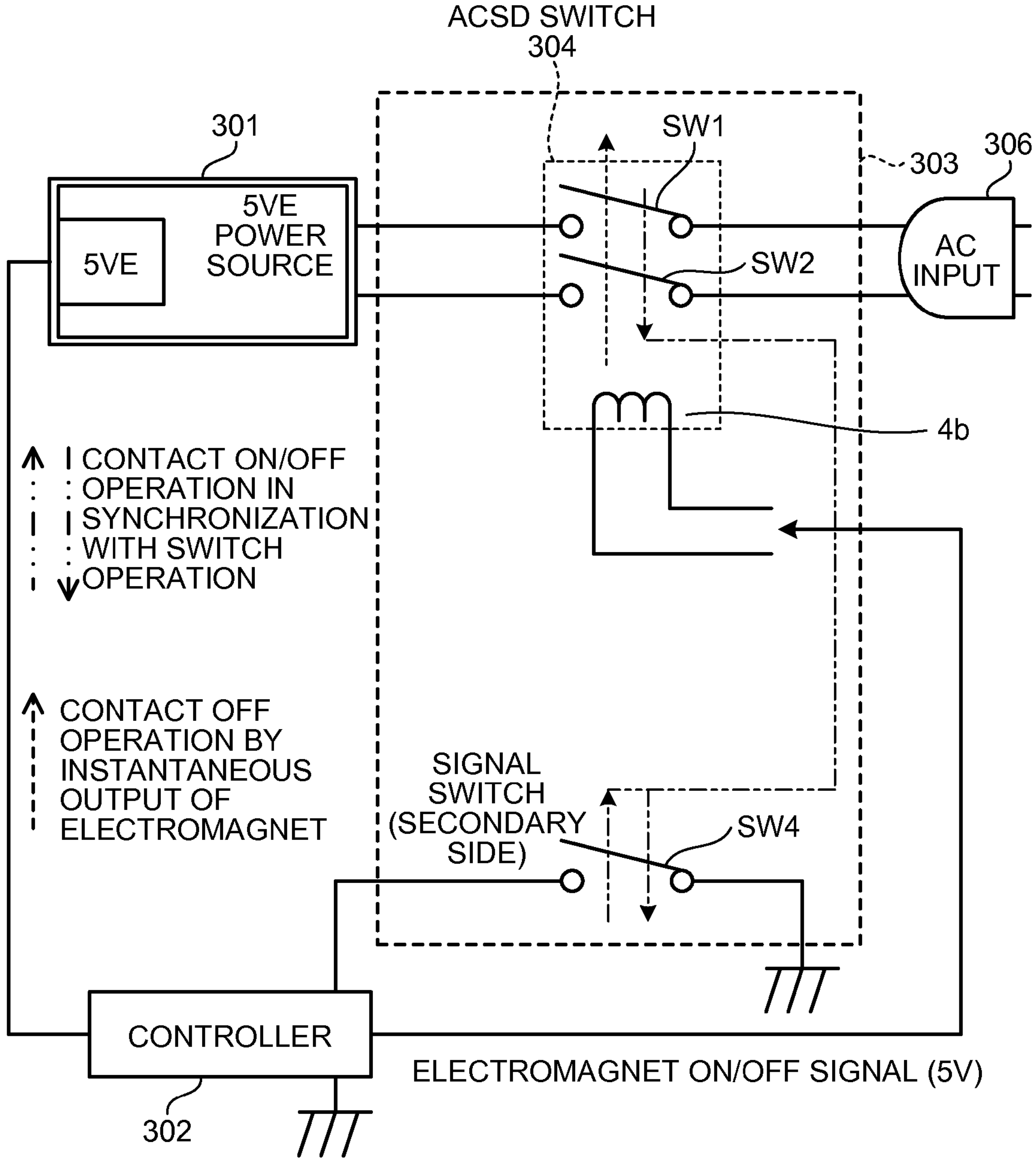
FIG. 3 is a circuit configuration diagram for explaining the operation of switch contacts and the flow of signals in the first embodiment.

Subsequently, there is described a circuit configuration for passing electric current through the electromagnet to put the first electrical contacts into the open state. FIG. 3 is a circuit configuration diagram for explaining the operation of the switch contacts and the flow of signals in the first embodiment.

As shown in FIG. 3, the circuit configuration according to the present embodiment mainly includes a 5VE power source 301, a controller 302, and a composite main switch 303.

The 5VE power source 301 is a power source for control of DC low-voltage, and is a power source that is required to constantly supply an output voltage of 5V-DC or the like when a control unit is in operation. The composite main switch 303 includes an AC shutdown switch 304, an electromagnet, and a signal switch SW4. In FIG. 3, only the electromagnet coil 4*b* of the electromagnet is illustrated.

The signal switch SW4 corresponds to the second switch contact lever-side contact (not shown) and the second switch terminal-side contact (not shown) as the second electrical contacts. Therefore, as described above, the signal switch SW4 goes into the closed state (contact on) in conjunction with on operation of the switch operation unit 1, and goes into the open state (contact off) in conjunction with off operation of the switch operation unit 1. The controller 302 can detect whether the switch operation unit 1 is on or off by detecting the on/off state of the signal switch SW4. Furthermore, the controller 302 is a control unit, so the controller 302 requires to be constantly supplied with an output voltage of 5V-DC or the like while the controller 302 is in operation.

The AC shutdown switch 304 includes switch circuits SW1 and SW2. Here, the switch circuits SW1 and SW2 correspond to the two pairs of the first electrical contacts, respectively. Namely, the switch circuit SW1 corresponds to the first switch contact lever-side contact 21*c* and the first switch terminal-side contact 21*d*, and the switch circuit SW2 corresponds to the first switch contact lever-side contact (not shown) and the first switch terminal-side contact (not shown) which correspond to the first switch contact lever 22 shown in FIG. 1.

When the switch operation unit 1 is turned on, these switch circuits SW1 and SW2 go into the on state, i.e., the closed state, thereby AC power is supplied to the 5VE power source 301 (the power source for control of DC low-voltage) from an AC input 306 of a commercial power source. On the other hand, when the switch operation unit 1 is turned off, to avoid sudden AC power shutdown, the contacts of the switch circuits SW1 and SW2 as the first electrical contacts are not immediately put into the open state by the above-described mechanism.

In FIG. 3, a chain double-dashed arrow indicates an on/off state of electrical contacts operating in conjunction with operation of the switch operation unit 1. Therefore, the switch circuits SW1 and SW2 go into the closed state (contact on) in conjunction with only the on operation of the switch operation unit 1 made when the switch circuits SW1 and SW2 are in the open state (contact off). (Once the switch circuits SW1 and SW2 go into the closed state (contact on), their contact states are maintained in the closed state (contact on) regardless of subsequent on/off operation of the switch operation unit 1.) To put the switch circuits SW1 and SW2 into the open state (contact off), electric current is just passed through the electromagnet coil 4*b* (to be described below).

Furthermore, a dotted arrow in FIG. 3 indicates that a state of switch contacts can be changed from on to off by instantaneous force of the electromagnet. The switch contacts correspond to respective contacts of the switch circuits SW1 and SW2. That is, when electric current is passed through the electromagnet coil 4*b*, the switch circuits SW1 and SW2 go into the open state.

The controller 302 is connected to the 5VE power source 301. The controller 302 detects the open/closed state of the signal switch SW4. When detecting the open state of the signal switch SW4, the controller 302 immediately performs pre-shutdown processing. In a case of an image forming apparatus, the pre-shutdown processing includes completion of processing in progress by a hard disk drive (HDD), cessation of read/write, completion of an image forming job, rotation of a cooling fan for a predetermined period of time, to place each movable object back to home position, and the like. Furthermore, in a case of an electrical device, a machine tool, a medical device, a motor vehicle, a transportation machine, and the like, the pre-shutdown processing includes completion or safety cessation of data recording or a job in progress, and the like.

When completed the pre-shutdown processing, the controller 302 outputs an electromagnet on signal to the electromagnet, and passes electric current through the electromagnet coil 4*b* of the electromagnet to turn the electromagnet on. Consequently, the respective contacts of the switch circuits SW1 and SW2 as the first electrical contacts go into the open state, i.e., the contact off state.

Here, the electromagnet on signal is an electrical signal to pass electric current through the electromagnet and turn the electromagnet on, thereby putting the first electrical contacts into the open state (contact off), that is, the electric current passing through the electromagnet is used as the electromagnet on signal. Besides this, a control signal to switch the passage of electric current through the electromagnet from off to on can be used as the electromagnet on signal (for example, as in a first modification of the first embodiment to be described later with reference to FIG. 5). However, the electromagnet on signal is not limited to these.

A moment, such as 0.1 second, is enough for the controller 302 to perform on control of the electromagnet. Therefore, energy consumed in performing the on control of the electromagnet is extremely low. Here, it is preferable that the controller 302 performs the on control of the electromagnet in a short time; however, in the case of the present embodiment, even if the on control of the electromagnet is continued, once the switch circuits SW1 and SW2 go into the open state, the power supply from the AC input 306 to the 5VE power source 301 is interrupted, so energy required for the controller 302 to pass electric current through the electromagnet automatically vanishes. In either configuration, the controller 302 can detect off operation of the switch operation unit 1 and determine a sequence of shutdown (open of AC switch contacts).

Figure 4:
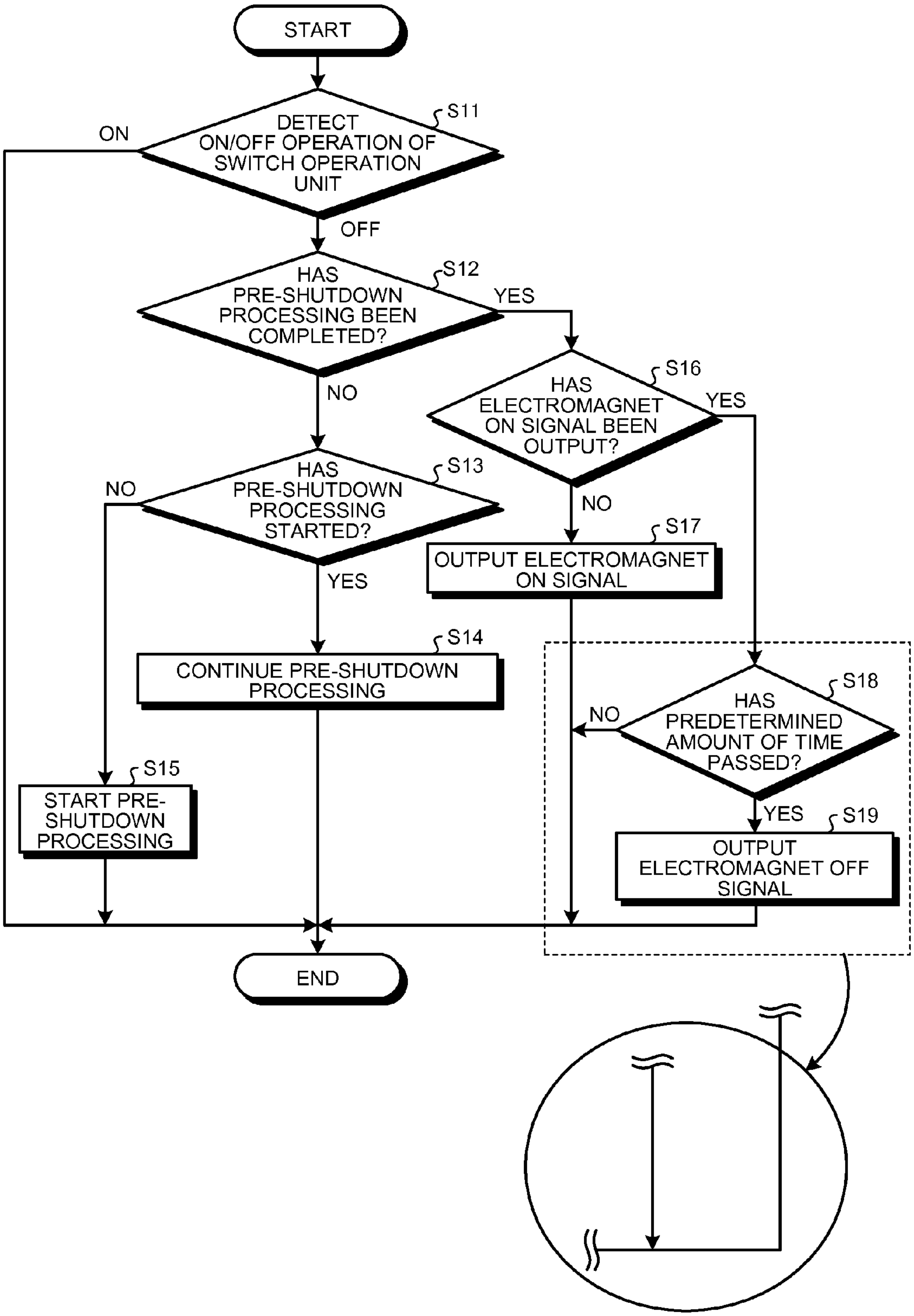
FIG. 4 is a flowchart showing a procedure of control processing performed by a controller according to the first embodiment.

Subsequently, there is described in detail the control by the controller 302 to switch the state of the first electrical contacts from contact on (the closed state) to contact off (the open state) when the switch operation unit 1 is turned off (on to off). FIG. 4 is a flowchart showing a procedure of control processing performed by the controller 302 according to the first embodiment. The controller 302 is configured to perform the control processing shown in FIG. 4 as a part of the main routine under controller control; alternatively, the controller 302 can be configured to perform the control processing at regular time intervals, such as at intervals of 20 milliseconds.

First, the controller 302 detects whether the second electrical contacts, i.e., the signal switch SW4 is in the open or closed state, thereby detecting whether the switch operation unit 1 is on or off (Step S11). Here, the controller 302 pulls an input signal up or down to a voltage other than GND via a resistor, thereby the controller 302 can detect the open/closed state of the signal switch SW4. Specifically, when detected that the signal switch SW4 is in the closed state, the controller 302 detects that the switch operation unit 1 is in the on state; on the other hand, when detected that the signal switch SW4 is in the open state, the controller 302 detects that the switch operation unit 1 is in the off state.

When the switch operation unit 1 is in the on state (ON at Step S11), the controller 302 stands by for the next processing. On the other hand, when the switch operation unit 1 is in the off state (OFF at Step S11), the controller 302 determines whether pre-shutdown processing has been completed or whether pre-shutdown processing is unnecessary (Step S12).

When determined that pre-shutdown processing has not been completed or that pre-shutdown processing is necessary (NO at Step S12), the controller 302 determines whether the pre-shutdown processing has started (Step S13). When the pre-shutdown processing has started (YES at Step S13), the controller 302 continues the pre-shutdown processing through to completion (Step S14), and stands by for the next processing. On the other hand, when the pre-shutdown processing has not started (NO at Step S13), the controller 302 starts the pre-shutdown processing (Step S15), and stands by for the next processing. The reason why the controller 302 performs this processing is because if the first electrical contacts are immediately put into the open state, sudden AC power shutdown occurs and becomes a problem.

At step S12, when determined that pre-shutdown processing has been completed or that pre-shutdown processing is unnecessary (YES at Step S12), it is not a problem if the first electrical contacts are immediately put into the open state, so the controller 302 determines whether an electromagnet on signal for putting the switch circuits SW1 and SW2, which are the first electrical contacts, into the open state has been output (Step S16). When an electromagnet on signal has not been output (NO at Step S16), the controller 302 outputs an electromagnet on signal (electric current passing through the electromagnet or a control signal to switch the passage of electric current through the electromagnet from off to on, etc.) (Step S17), and stands by for the next processing. This leads to passage of electric current through the electromagnet coil 4*b* of the electromagnet, and the electromagnet is turned on.

At Step S16, when an electromagnet on signal has been output (YES at Step S16), the controller 302 checks whether a predetermined amount of time has passed since the output of the electromagnet on signal at Step S17 (Step S18). When the passage of the predetermined amount of time cannot be confirmed (NO at Step S18), the controller 302 stands by for the next processing. On the other hand, at Step S18, when the passage of the predetermined amount of time can be confirmed (YES at Step S18), the switch circuits SW1 and SW2, which are the first electrical contacts, are put into the open state (contact off) by electromagnetic force, so the controller 302 outputs an electromagnet off signal (Step S19), and stands by for the next processing. Here, the electromagnet off signal is a signal to stop the passage of electric current through the electromagnet and turn the electromagnet off. Besides the stop of the passage of electric current, a control signal to switch the passage of electric current through the electromagnet from on to off can be used as the electromagnet off signal. However, the electromagnet off signal is not limited to these.

Incidentally, in the present embodiment, the electromagnet off signal is output after the predetermined amount of time has passed since the output of the electromagnet on signal (Steps S18 and S19); alternatively, the controller 302 can be configured to stand by for the next processing without performing Steps S18 and S19 if the electromagnet on signal has been output (YES at Step S16). Since the power supply from the AC input 306 to the 5VE power source 301 is shut off by subsequent contact off of the first electrical contacts (the switch circuits SW1 and SW2), energy required for the controller 302 to pass electric current through the electromagnet automatically vanishes. In the flowchart shown in FIG. 4, a dotted box portion can be changed to a solid round portion.

Furthermore, also when the switch operation unit 1 is in the on state, if the controller 302 inputs a shutdown execution signal at the discretion of the controller 302, it can be configured to control so as to turn the electromagnet (the electromagnet coil 4*b*) on, thereby forcibly changing the state of the first electrical contacts from on to off and turning the switch operation unit 1 off.

In this manner, in the present embodiment, even when the switch operation unit 1 is turned off, the first electrical contacts are not immediately put into the open state but maintained in the contact on state, and after completion of pre-shutdown processing, electric current is passed through the electromagnet, thereby putting the first electrical contacts into the open state, i.e., the contact off state; therefore, even if sudden off operation is performed on the switch operation unit 1, it is possible to shut down equipment with the switch device safely. Furthermore, when the equipment is not in use, the switch device can shut off the AC power. Moreover, wasted power consumed when the equipment is in operation or at the time of power-off is low; therefore, it is possible to reduce power consumption. Furthermore, required space for the switch and necessary parts is minimized; therefore, it is possible to achieve space-saving of the switch device. Moreover, it is possible to provide a switch device at lower production costs as compared with the conventional technologies.

Namely, in the first embodiment, out of the above-described problems (1) to (7), at least the problems (1) to (6) can be solved. A way to solve at least the problem (7) in addition to the problems (1) to (6) will be explained in embodiments below.

Second Embodiment

In a switch device as in the first embodiment, a state change of the first electrical contacts from on to off requires the control to off-to-on-to-off by means of an electrical signal from outside the switch. It is necessary to provide a means capable of certainly turning the first electrical contacts from on to off even if the switch device gets out of control to switch the first electrical contacts from on to off due to CPU runaway or the like.

For example, as a measure against runaway of the controller 302, there can be used a means of turning the electromagnet on, thereby disconnecting the AC power upon occurrence of any of a watchdog (WD) signal of the controller 302 and a communication error signal.

By use of such a means, the first electrical contacts can be turned from on to off even if the switch device gets out of the control to turn the first electrical contacts from on to off due to CPU runaway or the like. However, the switch device system or a switch apparatus including the switch device system automatically goes into the off state, which is a normal state, without a user of the switch device system or the switch apparatus noticing the abnormality. In the event of an abnormality in the switch device system or the switch apparatus due to CPU runaway or the like, it is preferable that the user recognizes the abnormality.

Therefore, in a second embodiment, the switch device is configured to be turned off by switching the first electrical contacts from on to off even if the switch device gets out of the control to turn the first electrical contacts from on to off due to CPU runaway or the like. Furthermore, the second embodiment achieves a switch device system and a switch apparatus including the switch device system enabling a user to recognize an abnormal condition thereof.

Figure 5:
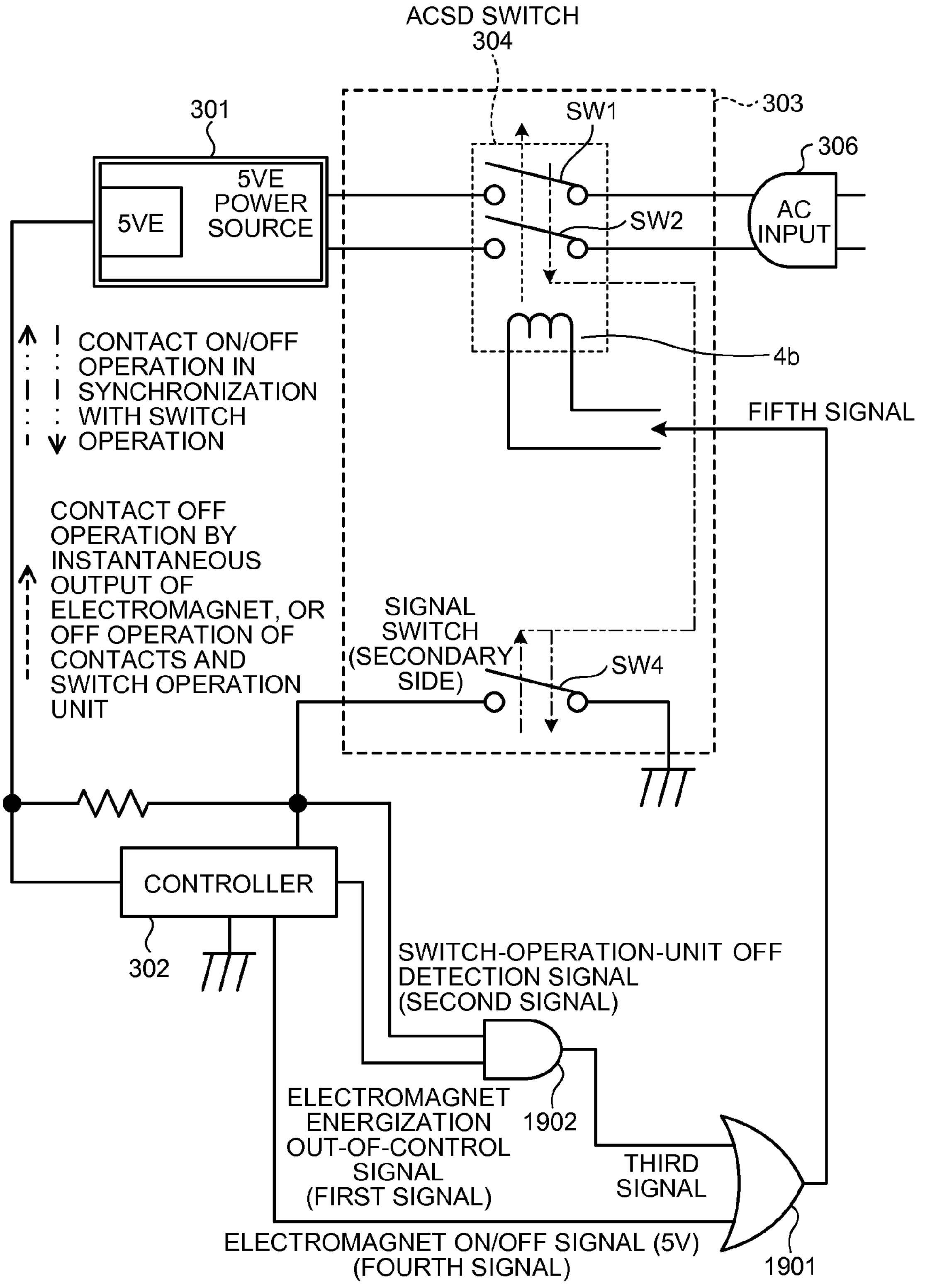
FIG. 5 is a circuit configuration diagram for explaining the operation of switch contacts and the flow of signals in a second embodiment.

FIG. 5 is a circuit configuration diagram for explaining the operation of switch contacts and the flow of signals in the second embodiment. In a switch according to the present embodiment, when the controller 302 is operating properly and is in a fit state to output an electromagnet on/off signal (a fourth signal) as needed, by control of this signal, energization of the electromagnet can be made through an OR circuit 1901, and the contact state of first electrical contacts of the switch can be changed from the on state to the off state. In this case, an electromagnet energization out-of-control signal (a first signal) shown in FIG. 5 is "L".

The electromagnet energization out-of-control signal is an example of a signal expressing whether control of an electrical signal for changing the contact state of the first electrical contacts from the on state to the off state is possible or not. For example, the electromagnet energization out-of-control signal is a signal output from the controller 302 when energization of the electromagnet cannot be controlled due to runaway of the controller 302 or the like. The electromagnet energization out-of-control signal becomes "L" when the controller 302 is operating properly, and becomes "H" when the controller 302 is not operating properly.

Furthermore, a switch-operation-unit off detection signal (a second signal) output when switch-off of the switch operation unit 1 has been detected is also "L" because the signal switch SW4 (the secondary side) is on (when the controller 302 is operating, AC power is supplied to the 5VE power source 301, so switch-on is required) and is connected to the GND side. Therefore, a third signal is also "L".

Also, when a user turned off the switch operation unit 1, if the controller 302 is operating properly, the electromagnet energization out-of-control signal (the first signal) is "L". Since the signal switch (the secondary side) is in the off state, the switch-operation-unit off detection signal (the second signal) is a signal via a 5V pull-up resistor, and the switch-operation-unit off detection signal (the second signal) becomes "H". Thereafter, after completing shutdown processing, the controller 302 outputs the electromagnet on/off signal (the fourth signal) at "H" output, and the state of the first electrical contacts (the switch circuits SW1 and SW2) can be changed from the on state to the off state, and the entire system goes into the off state.

On the other hand, if the controller 302 is not operating properly, the controller 302 is unable to control the output of an electromagnet on/off signal, so the electromagnet on/off signal (the fourth signal) is uncertain. Therefore, if this signal is fixed to "L", the state of the first electrical contacts cannot be changed from the on state to the off state by this signal. In this case, the electromagnet energization out-of-control signal (the first signal) shown in FIG. 5 is "H". And, the switch-operation-unit off detection signal (the second signal) is "L" because the signal switch (the secondary side) is in the on state. Therefore, at this point, the third signal is also "L". Thereafter, when a user of the switch device or apparatus comes to notice an abnormality and turns off the switch operation unit 1, the switch-operation-unit off detection signal (the second signal) becomes "H". Since the electromagnet energization out-of-control signal (the first signal) and the switch-operation-unit off detection signal (the second signal) are both "H", an output signal from an AND circuit 1902 (the third signal) shown in FIG. 5 also becomes "H". The "H" output signal from the AND circuit 1902 (the third signal) is transmitted to an input of the OR circuit 1901, and is output as an "H" fifth signal from the OR circuit 1901. This makes it possible to change the state of the first electrical contacts (the switch circuits SW1 and SW2) from the on state to the off state and also put the entire system into the off state.

In this manner, according to the present embodiment, the state of the first electrical contacts is not immediately changed from on to off even if there is an abnormality in the switch device system or a switch apparatus including the switch device system due to CPU runaway or the like. After a user of the switch device system or a switch apparatus including the switch device system comes to notice the abnormality and turns off the switch device, the state of the first electrical contacts is changed from on to off, and the switch device can be put into the off state. Therefore, it is possible to achieve a switch device system and a switch apparatus including the switch device system enabling a user to recognize an abnormal condition thereof.

Third Embodiment

Figure 6:
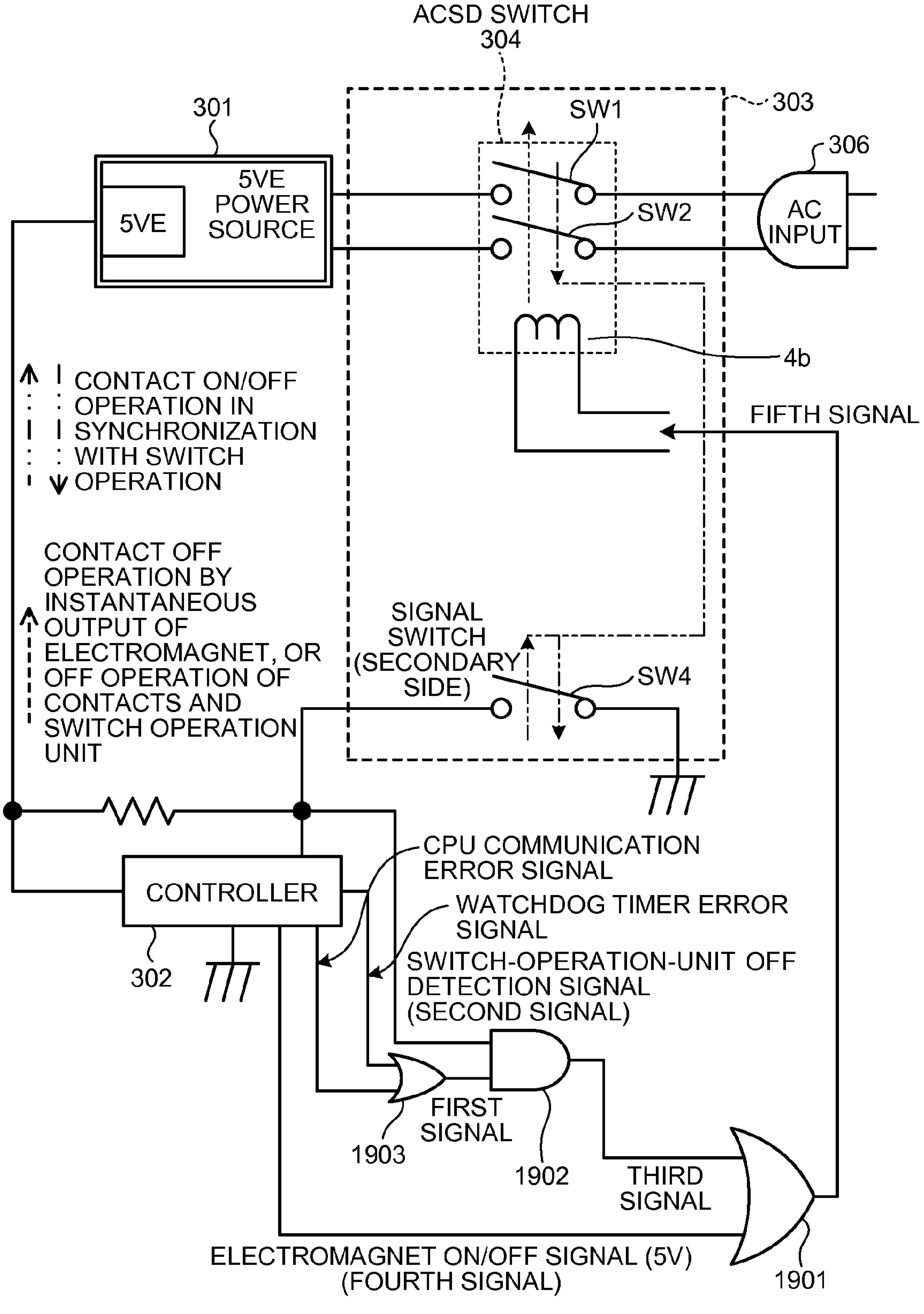
FIG. 6 is a circuit configuration diagram for explaining the operation of switch contacts and the flow of signals in a third embodiment.

FIG. 6 is a circuit configuration diagram for explaining the operation of switch contacts and the flow of signals in a third embodiment. Description of portions identical to those in the above embodiments is omitted. The same is true in FIGS. 7 to 9.

The circuit configuration diagram shown in FIG. 6 differs from the circuit configuration diagram in the second embodiment (FIG. 5) in that refinements are added to the electromagnet energization out-of-control signal (the first signal). Namely, the electromagnet energization out-of-control signal (the first signal) in the present embodiment is an output signal obtained by inputting a CPU communication error signal and a watchdog timer error signal to an OR circuit 1903. The CPU communication error signal is a signal generated when the controller 302, the system, or a CPU (not shown) of the apparatus fails to communicate. The watchdog timer error signal is a signal indicating an abnormal condition in which a watchdog timer of the controller 302, the system, or the CPU (not shown) of the apparatus is not cleared at regular time intervals.

Therefore, also in the third embodiment, in the same manner as in the first embodiment, the first signal can be treated as a signal to determine whether the controller 302 is normally controllable or uncontrollable.

Fourth Embodiment

Figure 7:
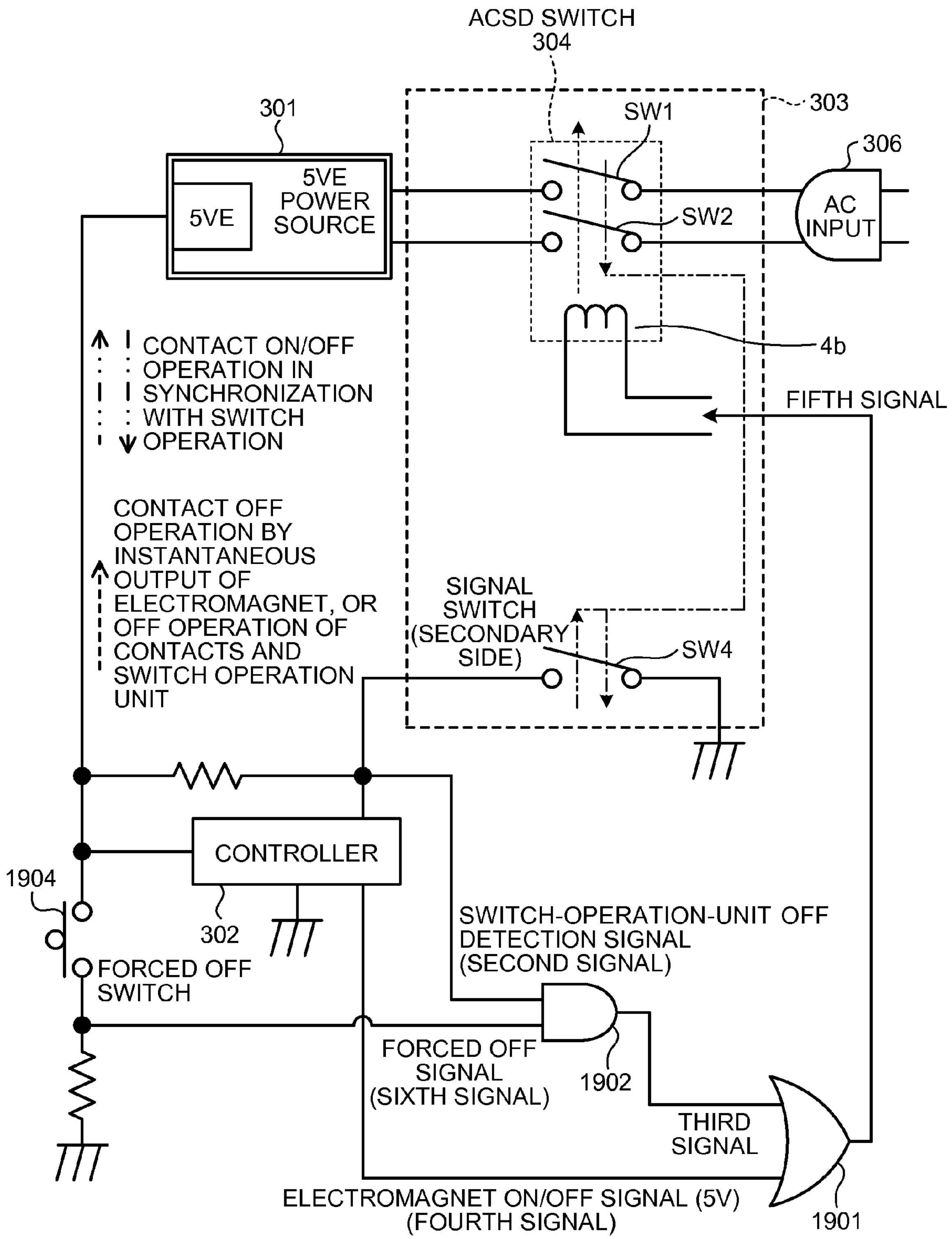
FIG. 7 is a circuit configuration diagram for explaining the operation of switch contacts and the flow of signals in a fourth embodiment.

FIG. 7 is a circuit configuration diagram for explaining the operation of switch contacts and the flow of signals in a fourth embodiment. The circuit configuration diagram shown in FIG. 7 differs from the circuit configuration diagram in the second embodiment (FIG. 5) in that the electromagnet energization out-of-control signal as the first signal is replaced by a forced off signal (in FIG. 7, a sixth signal) to forcibly turn off the switch (by operation of another switch). A forced off switch 1904 is, as shown in FIG. 7, a push-button switch that the voltage applied thereto is pulled down from 5V and the voltage state is changed to "H" when a user presses the switch as a forced off instruction.

This configuration enables a user to certainly recognize an abnormality in the system or the apparatus because as processing in the event of an abnormality, such as CPU runaway, a user of the system or the apparatus notices the abnormality and switches off the system or the apparatus, and then presses the forced off switch 1904 otherwise the system or the apparatus is not recovered.

Fifth Embodiment

Figure 8:
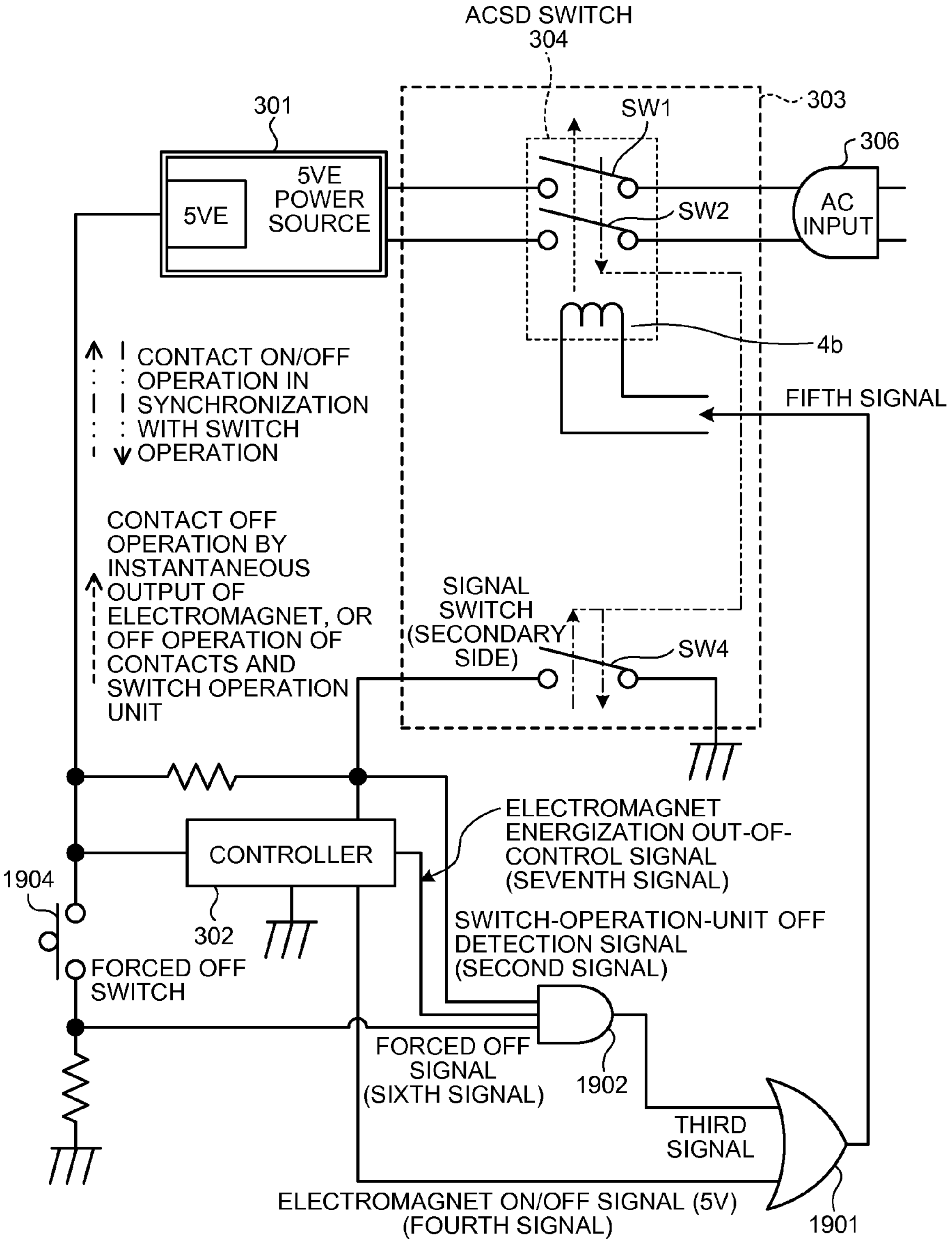
FIG. 8 is a circuit configuration diagram for explaining the operation of switch contacts and the flow of signals in a fifth embodiment.

FIG. 8 is a circuit configuration diagram for explaining the operation of switch contacts and the flow of signals in a fifth embodiment. The circuit configuration diagram shown in FIG. 8 differs from the circuit configuration diagram in the fourth embodiment (FIG. 7) in that an electromagnet energization out-of-control signal (a seventh signal) is added as an input signal condition of the AND circuit 1902 in the fourth embodiment.

In this configuration, as processing in the event of an abnormality, such as CPU runaway, a user of the system or the apparatus notices the abnormality and switches off the system or the apparatus, and then presses the forced off switch 1904 otherwise the system or the apparatus is not recovered; furthermore, if the user incorrectly determines an abnormality, the state of the first electrical contacts cannot be changed from the on state to the off state. Therefore, it is possible to prevent sudden AC shutdown of the system or the apparatus due to user's incorrect determination.

Sixth Embodiment

Figure 9:
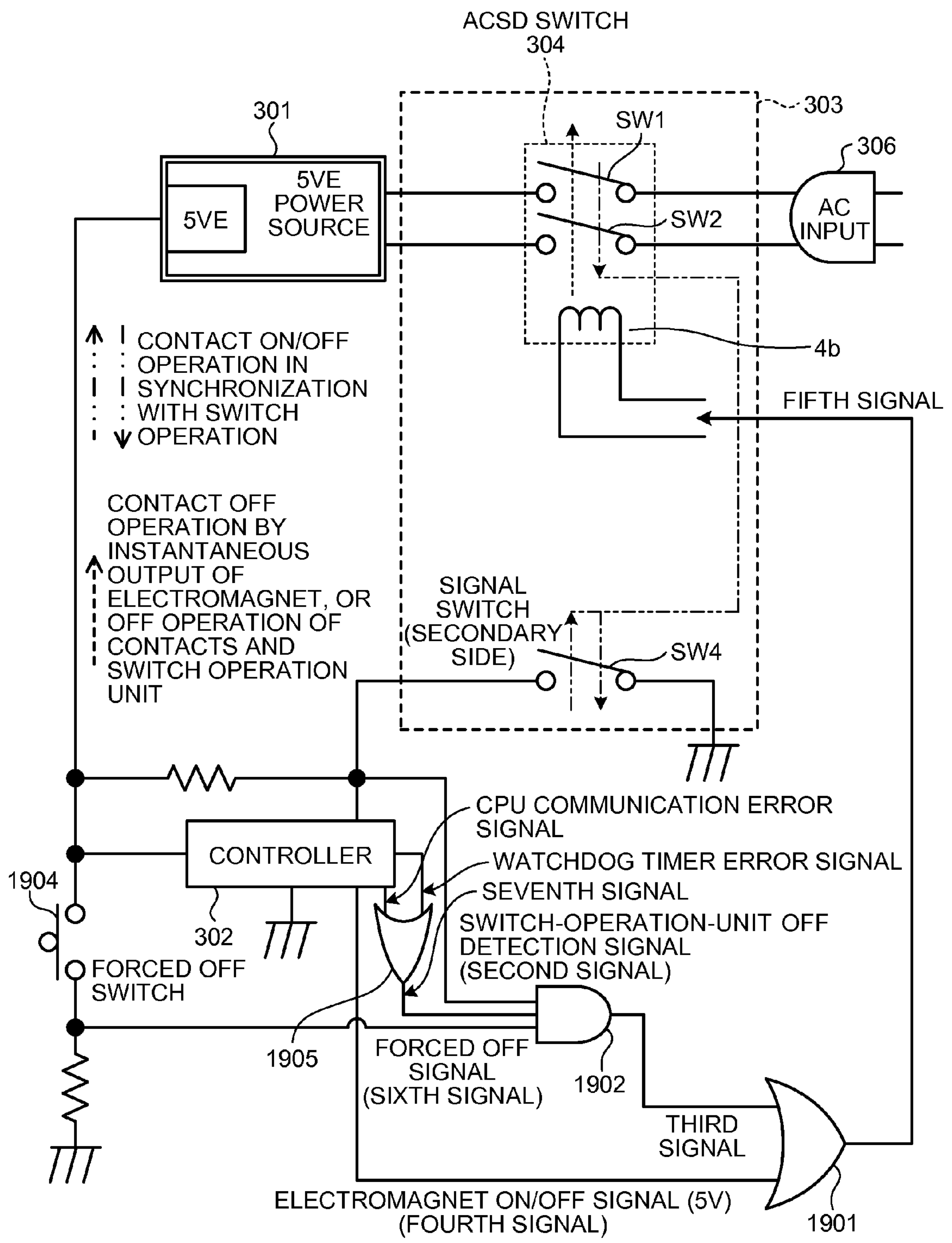
FIG. 9 is a circuit configuration diagram for explaining the operation of switch contacts and the flow of signals in a sixth embodiment.

FIG. 9 is a circuit configuration diagram for explaining the operation of switch contacts and the flow of signals in a sixth embodiment. The circuit configuration diagram shown in FIG. 9 differs from the circuit configuration diagram in the fifth embodiment (FIG. 8) in that refinements are added to the electromagnet energization out-of-control signal (the seventh signal). Namely, the electromagnet energization out-of-control signal (the seventh signal) in the present embodiment is an output signal obtained by inputting a CPU communication error signal and a watchdog timer error signal to an OR circuit 1905.

The embodiments are described above; however, the present invention is not limited to these embodiments.

Various modifications to the positional relation, direction, size, and the like of the components shown in FIGS. 1 and 2 are possible. Furthermore, the drawings shown in the embodiments are for explaining the nature of the present invention, and illustration and description of part departing from the scope of the present invention are omitted. For example, it goes without saying that a switch requires installation of springs in the lower part of the switch operation unit 1 and in between the switch contact levers 21, 22, and 3 to make the contact state of the switch contacts certain.

Moreover, in the above embodiments, on/off of the AC input 306 is described as an example of the first electrical contacts; however, the first electrical contacts are not limited to this. For example, the switch device according to any of the first to sixth embodiments and a switch device system composed of the switch device and an external unit can be applied to battery-equipped equipment, such as a motor vehicle, a transportation machine, an image forming apparatus, an electrical device, a machine tool, and a medical device. Furthermore, depending on differences in AC/DC and working voltage inside the switch, it is necessary to secure air clearance and a creepage distance for safety and functionality.

According to the embodiments, it is possible to safely shut down an apparatus even in the event of sudden turn-off of a power switch, and further possible to shut down AC power by operation of the power switch when the apparatus is not in use, and further possible to achieve less wasted power while the apparatus is in operation and while the apparatus is in off mode, and further possible to save the space required for the switch and necessary parts as much as possible, and further possible to produce a switch device at lower cost, and further possible to implement turn-off of switch contacts with certainty even in the event of out of control due to CPU runaway or the like and enables a user to recognize such an abnormal condition.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A switch device comprising:

a switch operation unit configured to be mechanically operated so as to be in an on state or an off state;

a detecting unit configured to detect whether the switch operation unit is in the on state or the off state;

a first mechanism to be configured to close electrical contacts of at least one circuit when the switch operation unit is operated to be in the on state from the off state; and a second mechanism configured to maintain the electrical contacts in a closed state and switch the electrical contacts from the closed state to an open state in response to electrical signals indicating off, on, and, off to be received sequentially while the switch operation unit is in the off state when the switch operation unit is operated to be in the off state from the on state, wherein the second mechanism outputs a fifth signal that is a logical OR of a third signal and a fourth signal, the third signal being a logical OR of a first signal indicating whether control of the electrical signal is possible or not and a second signal indicating detection of the switch operation unit being in the off state, the fourth signal being the electrical signal, if the first signal indicates that control of the electrical signal is not possible, the second mechanism outputs the third signal as the fifth signal, thereby switching the electrical contacts from the closed state to the open state, and if the first signal indicates that control of the electrical signal is possible, the second mechanism outputs the fourth signal as the fifth signal, thereby switching the electrical contacts from the closed state to the open state, wherein the first signal is a signal indicating at least one of a logical AND of a CPU communication error signal, a watchdog timer error signal, and a force-off signal.

2. The switch device according to claim 1, wherein the CPU communication error signal indicates that a CPU does not perform normal communication, and the watchdog timer error signal indicates an error state in which a watchdog timer is not cleared at regular time intervals.

3. The switch device according to claim 1, wherein the forced-off signal indicates an instruction to forcibly open the electrical contacts.

4. The switch device according to claim 1, wherein the third signal is a logical AND of the first signal, the second signal, and a forced-off signal indicating an instruction to forcibly open the electrical contacts.

5. An image forming apparatus comprising the switch device according to claim 1.

6. An electrical device comprising the switch device according to claim 1.

7. A medical device comprising the switch device according to claim 1.

8. A machine tool comprising the switch device according to claim 1.

9. A motor vehicle comprising the switch device according to claim 1.

10. A switch device comprising:

a switch operation unit configured to be mechanically operated so as to be in on state or off state;

a detecting unit configured to detect whether the switch operation unit is in the on state or the off state;

a first mechanism to be configured to close electrical contacts of at least one circuit when the switch operation unit is operated to be in the on state from the off state;

a second mechanism configured to maintain the electrical contacts in a closed state and switch the electrical contacts from the closed state to an open state in response to electrical signals indicating off, on, and, off to be received sequentially while the switch operation unit is in the off state when the switch operation unit is operated to be in the off state from the on state; and a third mechanism configured to switch the electrical contacts from the closed state to the open state in response to the electrical signals indicating off, on, and, off to be received sequentially and switch the switch operation unit from the on state to the off state when the switch operation unit is in the on state and the electrical contacts are in the closed state, wherein the second mechanism outputs a fifth signal that is a logical OR of a third signal and a fourth signal, the third signal being a logical OR of a first signal indicating whether control of the electrical signal is possible or not and a second signal indicating detection of the switch operation unit being in the off state, the fourth signal being the electrical signal, if the first signal indicates that control of the electrical signal is not possible, the second mechanism outputs the third signal as the fifth signal, thereby switching the electrical contacts from the closed state to the open state, and if the first signal indicates that control of the electrical signal is possible, the second mechanism outputs the fourth signal as the fifth signal, thereby switching the electrical contacts from the closed state to the open state, wherein the first signal is a signal indicating at least one of a logical AND of a CPU communication error signal, a watchdog timer error signal, and a force-off signal.

11. The switch device according to claim 10, wherein the CPU communication error signal indicates that a CPU does not perform normal communication, and the watchdog timer error signal indicates an error state in which a watchdog timer is not cleared at regular time intervals.

12. The switch device according to claim 10, wherein the forced-off signal indicates an instruction to forcibly open the electrical contacts.

13. The switch device according to claim 10, wherein the third signal is a logical AND of the first signal, the second signal, and a forced-off signal indicating an instruction to forcibly open the electrical contacts.

14. An image forming apparatus comprising the switch device according to claim 10.

15. An electrical device comprising the switch device according to claim 10.

16. A medical device comprising the switch device according to claim 10.

17. A machine tool comprising the switch device according to claim 10.

18. A motor vehicle comprising the switch device according to claim 10.

* * * * *